United States Patent
Samuelson et al.

(10) Patent No.: US 8,503,074 B2
(45) Date of Patent: Aug. 6, 2013

(54) IMAGING SYSTEM WITH AN OPTICAL MIRROR ARRANGEMENT AND SELF RIGHTING HOUSING

(75) Inventors: David W. Samuelson, London (GB); Iain A. Neil, Massagno (CH)

(73) Assignee: DSAM London LLP (GB)

( * ) Notice: Subject to any disclaimer, the term of this patent is extended or adjusted under 35 U.S.C. 154(b) by 843 days.

(21) Appl. No.: 12/593,158

(22) PCT Filed: Mar. 18, 2008

(86) PCT No.: PCT/GB2008/000963
§ 371 (c)(1),
(2), (4) Date: Jan. 13, 2010

(87) PCT Pub. No.: WO2008/117023
PCT Pub. Date: Oct. 2, 2008

(65) Prior Publication Data
US 2010/0108885 A1    May 6, 2010

(30) Foreign Application Priority Data

Mar. 27, 2007    (GB) .................................. 0705910.8

(51) Int. Cl.
*G02B 5/08* (2006.01)
*G01J 3/00* (2006.01)

(52) U.S. Cl.
USPC ............ 359/351; 359/366; 359/859; 250/353

(58) Field of Classification Search
USPC ......... 359/351, 364–366, 850, 851, 857–860; 348/335, 337; 250/353, 338.1, 336.1
See application file for complete search history.

(56) References Cited

U.S. PATENT DOCUMENTS

| | | | |
|---|---|---|---|
| 3,505,465 A | 4/1970 | Rees | |
| 4,037,943 A * | 7/1977 | Anzai | ............................ 359/859 |
| 4,395,093 A | 7/1983 | Rosendahl et al. | |
| 4,397,520 A | 8/1983 | Neil | |

(Continued)

FOREIGN PATENT DOCUMENTS

| | | |
|---|---|---|
| EP | 0863421 A1 | 9/1998 |
| GB | 1521087 | 8/1978 |

(Continued)

OTHER PUBLICATIONS

Peri et al. "Generation of Perspective and Panoramic Video from Omnidirectional Video", Proc. of DARPA Image Understanding Workshop, New Orleans May 2007, 3 Pages.

(Continued)

*Primary Examiner* — Frank Font
(74) *Attorney, Agent, or Firm* — Brooks Kushman P.C.

(57) ABSTRACT

A multi-wavelength band imaging system including a beam splitter is provided, allowing image capturing means adapted to specific wavelength bands to be used such as from visible to near infrared, intermediate infrared and far infrared. The system may have a field of view of substantially (360) degrees about an optical axis of the system and may fit into a golf ball sized housing. The imaging system includes a first convex mirror and a second concave mirror. Some embodiments for imaging single or close wavelength bands and not requiring a beam splitter are equally provided. Also provided is a self-righting housing for an imaging system, for example as described above, which self-rights under the action of gravity, thereby disposing the imaging system in an appropriate orientation.

15 Claims, 10 Drawing Sheets

U.S. PATENT DOCUMENTS

| | | | |
|---|---|---|---|
| 4,398,786 A | 8/1983 | Neil | |
| 4,411,488 A | 10/1983 | Neil | |
| 4,486,069 A | 12/1984 | Neil et al. | |
| 4,505,535 A | 3/1985 | Neil | |
| 4,679,068 A | 7/1987 | Lillquist et al. | |
| 4,751,571 A | 6/1988 | Lillquist | |
| 5,473,474 A | 12/1995 | Powell | |
| 5,835,132 A * | 11/1998 | Okino et al. | 348/42 |
| 5,841,574 A | 11/1998 | Willey | |
| 5,847,879 A * | 12/1998 | Cook | 359/631 |
| 6,122,111 A | 9/2000 | Neil et al. | |
| 6,208,459 B1 | 3/2001 | Coon et al. | |
| 6,333,826 B1 * | 12/2001 | Charles | 359/725 |
| 6,392,687 B1 * | 5/2002 | Driscoll et al. | 348/36 |
| 6,424,377 B1 * | 7/2002 | Driscoll et al. | 348/335 |
| 6,449,103 B1 * | 9/2002 | Charles | 359/725 |
| 6,480,229 B1 * | 11/2002 | Driscoll et al. | 348/335 |
| 6,611,282 B1 * | 8/2003 | Trubko et al. | 348/36 |
| 6,744,569 B2 * | 6/2004 | Geng | 359/725 |
| 6,789,908 B2 * | 9/2004 | Garcia | 359/859 |
| 6,791,598 B1 * | 9/2004 | Luken et al. | 348/36 |
| 6,793,356 B2 * | 9/2004 | Kumata et al. | 359/852 |
| 7,049,597 B2 * | 5/2006 | Bodkin | 250/353 |
| 7,123,421 B1 | 10/2006 | Moskovich et al. | |
| 2002/0121574 A1 | 9/2002 | Davis | |
| 2004/0021766 A1 | 2/2004 | Daniilidis et al. | |
| 2006/0208193 A1 * | 9/2006 | Bodkin | 250/353 |
| 2008/0247061 A1 * | 10/2008 | Simkulet et al. | 359/730 |

FOREIGN PATENT DOCUMENTS

| | | |
|---|---|---|
| GB | 2136149 A | 9/1984 |
| GB | 2158261 A | 11/1985 |
| JP | 2001094839 A | 4/2001 |
| WO | 2004111689 A2 | 12/2004 |
| WO | 2005078502 A1 | 8/2005 |

OTHER PUBLICATIONS

Nayar, "Catadioptric Omnidirectional Camera", Department of Computer Science, Columbia University 1997, p. 482-488.

Kumler et al. "Fisheye Lens Designs and Their Relative Performance", Current Developments in Lens Design and Optical Systems Engineering Oct. 2000, p. 360-369.

Http://www1.cs.columbia.edu/cave/projects/cat_cam_360.php ; Cave/ Project: Catadioptric Cameras for 360 Degree Imaging 3 Pages.

Http://www1.cs.columbia.edu/CAVE/projects/app_cam_360/app_cam_360.php ; CAVE/Projects: Applications for 360 Degree Cameras 3 Pages.

Baker et al. "A Theory of Catadioptric Image Formation" Department of Computer Science Columbia University 1998, p. 35-42.

Nayar et al. "Folded Catadioptric Cameras", Department of Computer Science Columbia University, CycloVision Technolgoies; p. 217-223.

Baker et al. "A Theory of Single-Viewpoint Catadioptric Image Formation" International Journal of Computer Vision 1999, vol. 35, No. 2, p. 175-196.

Juergens, "Infrared Optical Systems", OPTI 696, Practical Optics Seminar, Oct. 4, 2006, 33 Pages.

Http://www.elcan.com/ ; Elcan Optical Technologies.

Ferrante et al. "Visible/Long-Wave Infrared Dichroic Beamsplitter", Optical Engineering Jun. 2005, vol. 44, No. 6, p. 063801-1 through p. 063801-4.

Byard, "Dual Channel Near Infrared/Visible Imaging Systems", Proc. SPIE 1998, vol. 3354, p. 701-703.

* cited by examiner

IMAGING SYSTEM WITH AN OPTICAL MIRROR ARRANGEMENT AND SELF RIGHTING HOUSING

This invention relates to an imaging system, in particular although not exclusively a multi-wavelength band imaging system for imaging both in the visible, near infrared and intermediate infrared wavelength bands and, more particularly such an imaging system having a substantially 360 degree field of view. The invention further relates to a self-righting housing for an imaging system.

Many known imaging systems work over a limited band of wavelengths, for example either visible or near infrared. Imaging systems adapted for visible wavelengths tend to have optical elements which may not be optimally transparent for intermediate infrared radiation and, conversely, systems adapted for imaging of intermediate infrared radiation may have an image sensor such as a charge coupled device (CCD), a complimentary metal-oxide semiconductor (CMOS) device or other electronic detector or film which is not optimally adapted for visible wavelengths. Hence the wavelengths which can be used for imaging are limited.

Many modern panoramic imaging applications, such as for home and commercial property monitoring, require optical objective systems with extremely large fields of view. Known panoramic imaging systems can meet some of these application requirements but tend to be large in size, heavy in weight, of high cost and cover limited wavelengths of the radiation being sensed. In "*Fisheye Lens Design and their Relative Performance*", James Kumler and Martin Bauer, Proceedings of SPIE—Volume 4093 *Current Developments in Lens Design and Optical Systems Engineering*, Robert E. Fischer, R. Barry Johnson, Warren J. Smith, William H. Swantner, Editors, October 2000, pp. 360-369, many refractive systems are described which show the overall system complexity. In particular, multiple waveband refractive imaging systems are dependent on a small variety of available refractive materials which, in addition to being expensive and thermally sensitive, normally require multiple elements to correct the chromatic aberrations for good performance but necessarily increase size and weight of the system.

In one embodiment of the invention, an objective system for a multi-wavelength band imaging system which includes a beam splitter and is arranged to collect radiation from an object space to deliver it to image planes corresponding to respective first and second wavelengths bands. In an imaging system including such an objective system, an image sensor associated with each image plane is adapted for imaging in the respective corresponding wavelengths band. Advantageously, this allows each image sensor to be specifically adapted for the corresponding wavelengths to increase the quality of the captured image.

The objective system may include a convex reflective surface such as a mirror arranged to receive radiation from the object space, a concave reflective surface arranged to receive radiation from the convex reflective surface and reflect it through an aperture in the convex reflective surface to provide a substantially 360 degree field of view about an optical axis in the first and second image planes. The objective system may further include a lens between the aperture and the beam splitter which, advantageously, allows the beam splitter to be smaller than would otherwise be possible.

The system may further include a window surrounding the objective system, for example a frustoconical, arcuate or part spherical window which may be provided in one piece or segmented.

A multi-waveband imaging system may include two systems as described above mounted back to back to each other and in which radiation split by the beam splitters along respective longer optical paths is reflected by the beam splitter, for example visible to near infrared waveband radiation, and radiation split by the beam splitter along respective shorter optical paths is transmitted by the beam splitter, for example intermediate infrared radiation.

In further embodiments of the invention, a self righting housing for an imaging system which has a substantially 360 degrees field of view is provided in which the housing is weighted at a bottom end which defines an outer surface such that the housing self rights into an upright orientation under the action of gravity. The housing further includes a window to provide a substantially 360 degree field of view about an axis along the upright orientation of the housing.

The housing may include a wireless transmitter for transmitting images captured by an image sensor and an energy storage device for powering the wireless transmitter and image sensor. Advantageously, the energy storage device may provide at least some of the self-righting weight of the bottom end. By transmitting images only when differences in the captured images are detected, energy efficiency may be increased.

The housing may house a multi-waveband imaging system as described above and, in particular, the concave reflective surface may be secured adjacent the top end of the housing opposite the bottom end, the remaining imaging system being secured adjacent the bottom end.

In yet a further embodiment, an imaging system comprising an assembly of imaging systems as described above (or similarly imaging systems not specifically adapted for multi-wavelength band imaging) is provided. Because the imaging systems described above have an arrangement of two mirrors, a first mirror which receives radiation from an object and a second mirror which directs radiation from the first mirror to an imaging plane, the second mirror obscures part of the field of view, creating a blind spot. By arranging these blind spots appropriately, a contiguous field of view with no angular blind spot may be created from the fields of view of the constituent imaging systems. Although a (linear) gap separates the fields of view of the constituent imaging system, since the fields of view are angularly contiguous, the gap is below the linear resolution of the imaging systems at a sufficiently large distance (say larger than ten meters in some embodiments) so that the field of view is contiguous for most practical applications.

For the avoidance of doubt, throughout this description, reference to visible wavelengths refers to the band from 500 to 650 nanometers, near infrared refers to 650 to 2500 nanometers, intermediate infrared wavelengths refers to the band between 3000 and 5000 nanometers and far infrared refers to 7500 to 14500 nanometers. These numerical values are approximate only, as a skilled person will be well aware in relation to these wavelength bands. A clear band gap due to atmospheric water absorption has a lower bound of about 2.6 to 2.7 microns which can be used to define a separating wavelength between the near and intermediate infrared bands.

Embodiments of the invention are now described in detail by way of example only and with reference to the accompanying drawings in which.

Figure 1A:
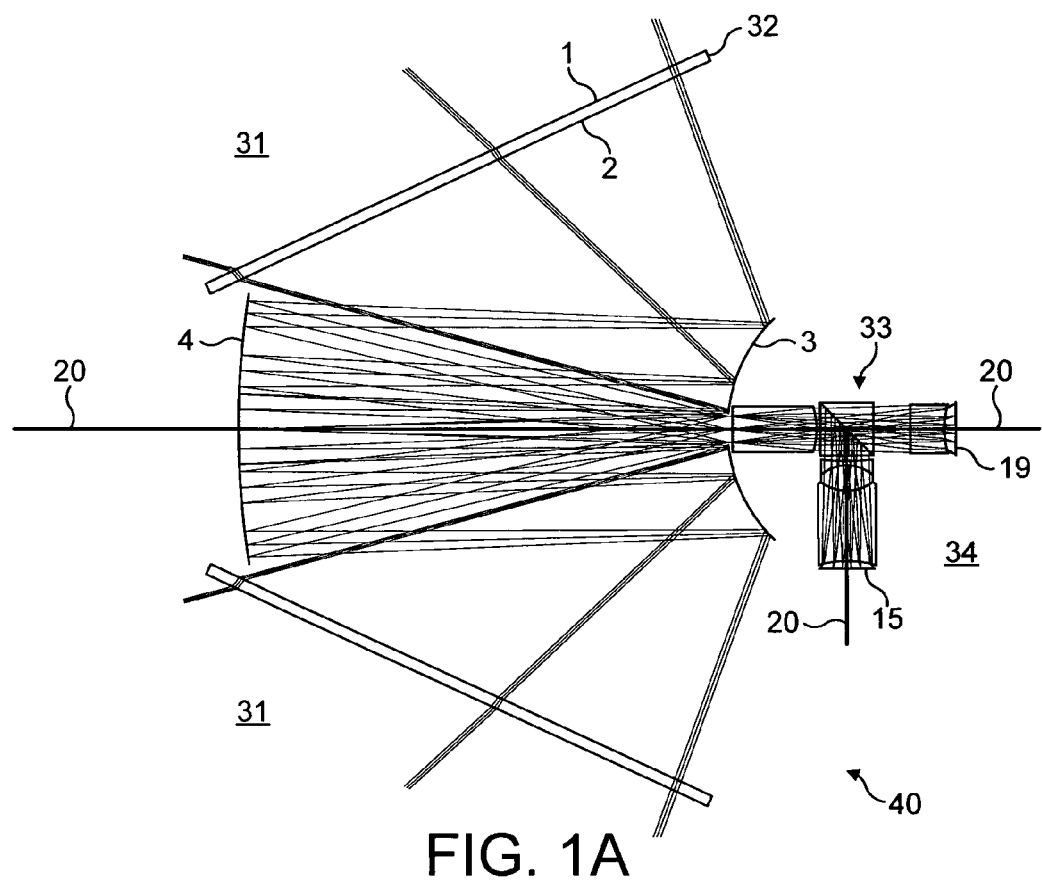
FIG. 1A is a schematic representation of an objective system for a multi-wavelength band imaging system.

With reference to FIGS. 1A and B, an object space 31 is imaged by a multi-wavelength band imaging system 40 into a first image plane 15 and a second image plane 19 in an image space 34. Radiation from the object space 31 passes through a window 32 having a first surface 1 and a second surface 2 and impinges on a reflective surface 3, for example of a curved mirror, to be reflected to a second reflective surface 4, for example of another curved mirror. The reflective surfaces may be metallic, for example gold or silver, thin films on a glass substitute. Reflective surfaces 3 and 4 are centred on an optical axis 20 and reflective surface 3 defines an aperture or stop 5, again centred on the optical axis 20. FIGS. 1A and B are cross-sections of the imaging system and, in one embodiment, the three dimensional object can be obtained as a body of rotation through 180 degrees of the cross-section shown in the figures.

The reflective surface 4 reflects incoming radiation back towards the reflective surfaces 3 from where the radiation is reflected through the aperture 5 and then passes through a lens having a surface 6 adjacent the aperture and an opposed surface 7 to a cube beam splitter of appropriately transmissive material, for example ZnS, having a first surface 8 adjacent to surface 7 and a beam splitting surface 9 which splits the incoming beam to exit the beam splitter via a first surface 10 and a second surface 16.

The beam splitter is arranged so that the radiation reflected by the beam splitter surface 9 leaves the beam splitter through the surface 10 with its optical axis at right angles to the incoming beam optical axis to be imaged by a lens grouping having surfaces 11, 12, 13 and 14 in the first image plane 15. Radiation which is transmitted by the beam splitting surface 9 leaves the beam splitter through surface 16 to be imaged by a lens having surfaces 17 and 18 onto a second image plane 19.

The first lens element (surfaces 6 and 7) adjacent the aperture 5 is optional. However, advantageously, if this lens is positively powered it will reduce the size of the beams of radiation such that the size of the surfaces 8 and 16 of the beam splitter can be reduced. Without this lens, these surfaces would need to grow by about a factor of 2. The resulting increased volume of the beam splitter (by about a factor of 8) would result in increased cost due to the additional beam splitter material needed, as well as space constraint and practical limitations for remaining optics if the size of the system is to be kept the same.

The beam splitting surface 9 is arranged to reflect visible and near infrared radiation to the image plane 15 and to transmit intermediate infrared wavelength radiation to image plane 19. Thus, the incoming radiation is imaged in two different image planes in dependence upon its wavelengths, allowing image capturing means provided in the respective image planes to be adapted to the respective wavelength bands. In the specific embodiment of splitting the radiation into visible to near infrared and intermediate infrared radiation, image capturing means provided in image plane 15 can be adapted to the visible to near infrared wavelength bands, for example by selecting appropriate film material or using a CCD or CMOS device adapted for this wavelength band. Similarly, the image capturing means provided in image plane 19 can be specifically adapted to intermediate infrared wavelengths, using an appropriate film or CCD or CMOS device. For example, a CCD for use in the intermediate infrared band may have larger pixels than a CCD adapted for the visible to near infrared band.

Where the beam splitter transmits most of the radiation in one band and reflects most of the radiation in the other, efficiency is high compared to a wavelength indiscriminate arrangement where most of 50% of both bands is reflected and transmitted. The beam splitting surface is coated with a commercially available (from ELCAN Optical Technologies, http://www.elcan.com/) thin film coating for ZnS substrates to give the desired wavelength splitting.

It is equally envisaged to adapt the imaging system to other splits of wavelength bands. For example, the beam splitter could be arranged to transmit far infrared radiation or both far and intermediate infrared radiation, with appropriate adaptation of the image capturing means. Similarly, the beam splitter could be arranged to split the incoming radiation to a visible wavelength band and a near infrared wavelength band such that the respective image capturing means can be adapted accordingly. Any other split by wavelengths is equally envisaged or, alternatively, the beam splitter may be arranged to split the incoming radiation irrespective of wavelengths such that each image plane receives half of the intensity of the overall radiation spectrum. While potentially less efficient, this would still allow the respective image capturing means to be adapted specifically for the wavelengths of interest, possibly using filters to filter out the remaining spectrum. Furthermore, while a cube beam splitter as described above may result in better image quality in the transmitted path, a plate beam splitter may be used instead, for example a plate beam splitter including a dichroic coating on a Ge substrate. A pellicle beam splitter, for example a Ge pellicle, may also be used (generally, a pellicle beam splitter will have an aspect ratio of diameter to thickness of 20:1). Since all of these plate beam splitters reflect one of the wavelength bands at an outer surface, with only one band traversing the beam splitter, it is sufficient if the beam splitter is able to transmit in the transmitted wavelength band.

In the specific embodiment described above with reference FIGS. 1A and B, the beam splitter is arranged to reflect visible and near infrared wavelength radiation and to transmit intermediate infrared wavelength radiation. Because, the optical path for the visible to near infrared wavelength radiation to image plane 15 is somewhat shorter than the path for the intermediate wavelength radiation, this is advantageous in certain embodiments where two imaging systems as described above are placed back to back to each other in order to achieve a close to spherical (rather than close to hemispherical) field of view because the longer optical path being folded sideways allows the two systems to be placed closer to each other back to back, thereby minimising the lost field of view along the circumference of the resulting near spherical field of view.

For efficient multi-wavelength band operation, the optical elements, including the window 32, should be transparent over all of the wavelengths to be imaged. This means that all optical elements lying in the optical path from the object space to the second image plane 19, including the elements in the path common to both image planes prior to the beam splitter, should be transparent to at least the intermediate infrared band. For example these elements may be manufactured from chemical vapour deposited (CVD) ZnS, ZnSe or diamond, all transparent from visible wavelengths up to the far infrared. Other suitable materials include sapphire or pure crystalline MgO. In addition, the lenses may be supplied with appropriate coating to ensure that they transmit over the entire range of wavelengths required or at least those portions which are required.

In another variant, the image sensors are displaced from the optical axis with respect to each other such that the images formed are offset with respect to each other. The difference between the two images can be used for range finding or stereo imaging using suitable image analysis.

A particular optical prescription for the specific embodiment described above with reference to FIGS. 1A and B is set out below in Table 1 in conjunction with the accompanying notes. Surface references numbers in the table correspond to the respective reference numerals used in the accompanying figures and the text above.

TABLE 1

Optical Prescription

| Item | Radiation path | Surface | Separation[1] (mm) | Radius of curvature[2,3] (mm) | Material[4,5] Type | Material[4,5] Name | Surface action | Aperture height (mm) |
|---|---|---|---|---|---|---|---|---|
| Object | Both | Ø | 459.0000 | 500.0000 | Air | — | — | — |
| Window | Both | 1 | 1.3662 | Infinity | CVD | ZnS | Refraction | — |
|  | Both | 2 | 41.0000 | Infinity | Air | — | Refraction | — |
| Mirror 1 | Both | 3 | −24.9000 | 5.7413 | Air | — | Reflection | 5.56 |
| Mirror 2 | Both | 4 | 24.9500 | 41.3947 | Air | — | Reflection | 6.60 |
| Stop | Both | 5 | 0.3000 | Infinity | Air | — | — | 0.60 |
| Lens 1 | Both | 6 | 4.4000 | 33.0649 | CVD | ZnS | Refraction | 0.68 |
|  | Both | 7 | 0.1000 | −8.0968 | Air | — | Refraction | 1.07 |
| Beam-splitter prism | P1 | 8 | 1.3900 | Infinity | CVD | ZnS | Refraction | 1.07 |
|  | P1 | 9 | 1.3900 | Infinity | CVD | ZnS | Reflection | — |
|  | P1 | 10 | 0.1978 | Infinity | Air | — | Refraction | 1.11 |
| Lens 2 | P1 | 11 | 0.1750 | −9.8110 | Glass | S-TIH14 | Refraction | 1.12 |
| Lens 3 | P1 | 12 | 1.3336 | 1.6129 | Glass | S-LAH65 | Refraction | 1.17 |
| Lens 4 | P1 | 13 | 3.7000 | −2.1146 | Glass | S-TIH6 | Refraction | 1.18 |
|  | P1 | 14 | 0.4101 | 3.7094 | Air | — | Refraction | 1.31 |
| Image 1[6] | P1 | 15 | 0.0000 | Infinity | Air | — | — | — |
| Beam-splitter prism | P2 | 8 | 1.3900 | Infinity | CVD | ZnS | Refraction | 1.08 |
|  | P2 | 9 | 1.3900 | Infinity | CVD | ZnS | Refraction | — |
|  | P2 | 16 | 1.8177 | Infinity | Air | — | Refraction | 1.13 |
| Lens 5 | P2 | 17 | 1.7409 | 23.4806 | CVD | ZnS | Refraction | 1.20 |
|  | P2 | 18 | 0.6150 | 3.8891 | Air | — | Refraction | 1.18 |
| Image 2[7] | P2 | 19 | 0.0000 | Infinity | Air | — | — | — |

Notes:
[1] The negative separation of surface 3 signifies a reversal in the optical axis direction after surface 3. Surface separation is measured along the optical axis.
[2] The surface tilt angles of window surfaces 1 and 2 are both 65 degrees about the optical axis with a closest approach to the optical axis near mirror 2 and when both surfaces are rotated around the optical axis by 360 degrees they form a conically shaped window component.
[3] Surface profiles of aspheric surfaces 3 and 4 are governed by the following conventional equation:

$$Z = \frac{CURV(R)^2}{1 + (1 - (1 + K)(CURV)^2 R^2)^{1/2}} + (A)R^4$$

where:
CURV = 1/(Radius of Curvature)
K, A = Coefficients
Z = Position of surface profile for a given Y value or measured along the optical axis from the pole (i.e. axial vertex) of the surface
R = Radial aperture height of surface measured from the X and Y axis, where:
$R = (X^2 + Y^2)^{1/2}$
The coefficients for the mirror surface S3 are:
$K = -0.5905$ and $A = -7.3371 \times 10^{-4}$
The coefficients for the mirror surface S4 are:
$K = -1.1287$ and $A = -1.6315 \times 10^{-5}$
[4] Zinc Sulphide (ZnS) is a chemically vapour deposited (CVD) material.
[5] The glasses listed are available from Ohara Corporation.
[6] Image 1 (path P1) is formed by radiation in the waveband 500-1,000 nm.
[7] Image 2 (path P2) is formed by radiation in the waveband 3,000-5,000 nm.

Adding up the surface separations from the surface 4 of mirror 1 to image plane 2 gives less than 37 mm as the longest dimension of the optical arrangement such that, allowing space for defectors, associated electronics and mountings for the optical components, the system could be fit into a housing of a size of the order of a golf ball.

Figure 2:
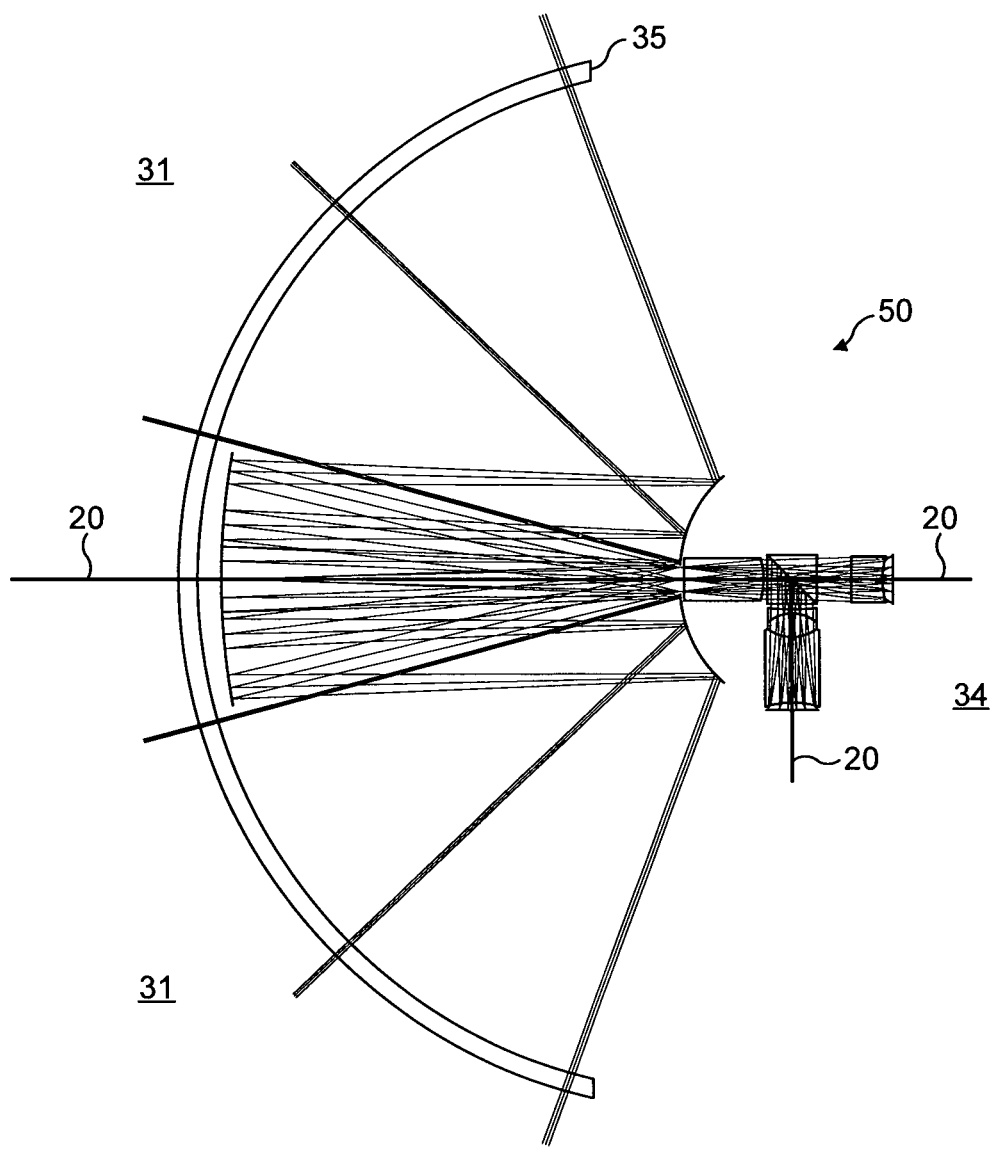
FIG. 2 depicts an alternative embodiment of the system in FIGS. 1A and B.

Although the window 32 in the specific embodiment of FIGS. 1A and B is flat, other geometries are also envisaged and a curved window 35 may be used in an alternative embodiment 50 depicted in FIG. 2. In yet a further alternative embodiment 60 depicted in FIG. 3, the dome window extends only over the sides of the embodiment covering substantially only the field of view of the imaging system and does not extend into those portions obscured by the reflective surface 4. This alternative arrangement may provide a reduced cost solution compared to the embodiment 50 as less material is required for the window to provide an equivalent field of view. Where environmental protection of the optical components of the imaging system is not required, the window may be omitted completely, resulting in further cost savings.

Figure 1B:
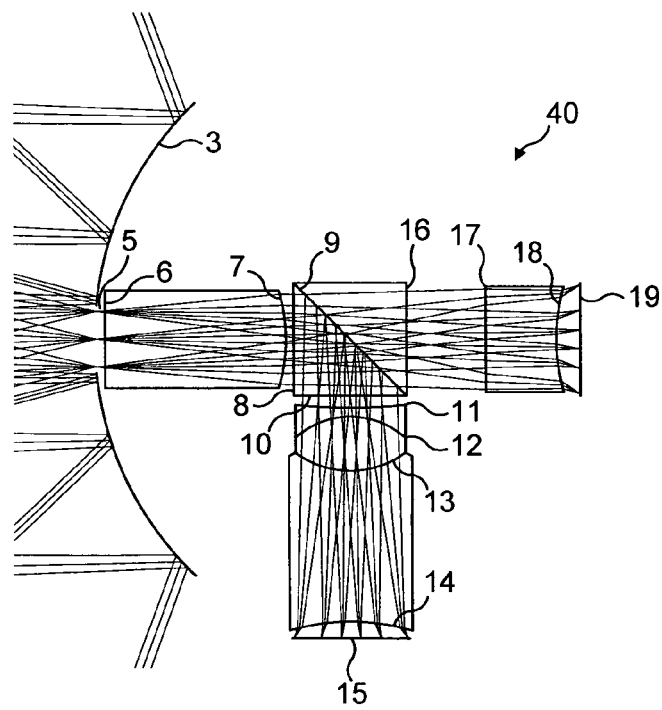
FIG. 1B is an enlarged view of a part of the system of FIG. 1A.
Figure 3:
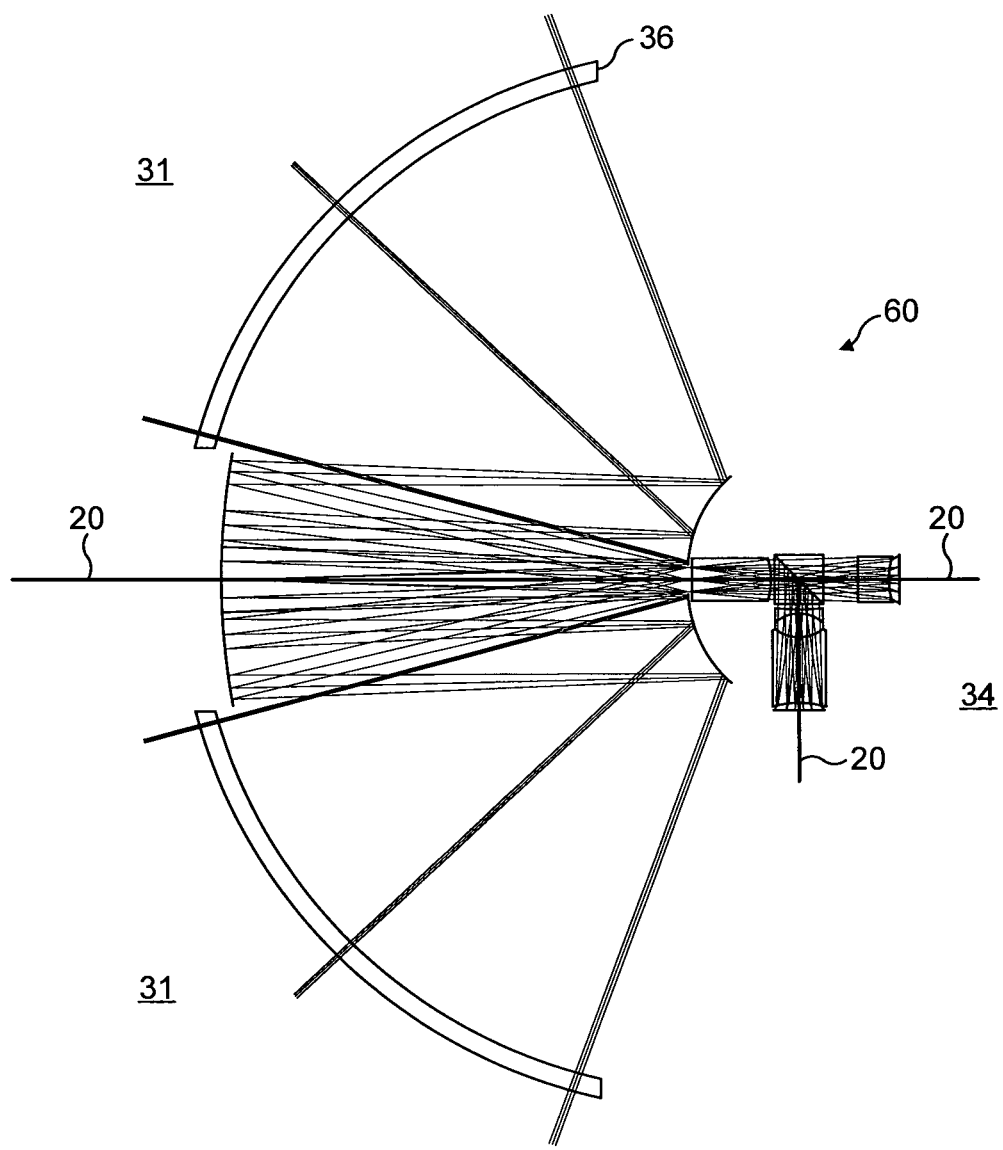
FIG. 3 depicts a further alternative embodiment.

In FIGS. 1 to 3 and the corresponding description above, the housing of the multi-wavelength band imaging system has been omitted so far. However, it will be understood by the skilled person that any appropriate housing ensuring secure relative positioning of the optical components and image capture means may be used and a large number of possible arrangements will be apparent to the skilled person. A specific embodiment of a housing is described below in further detail.

Figure 4:
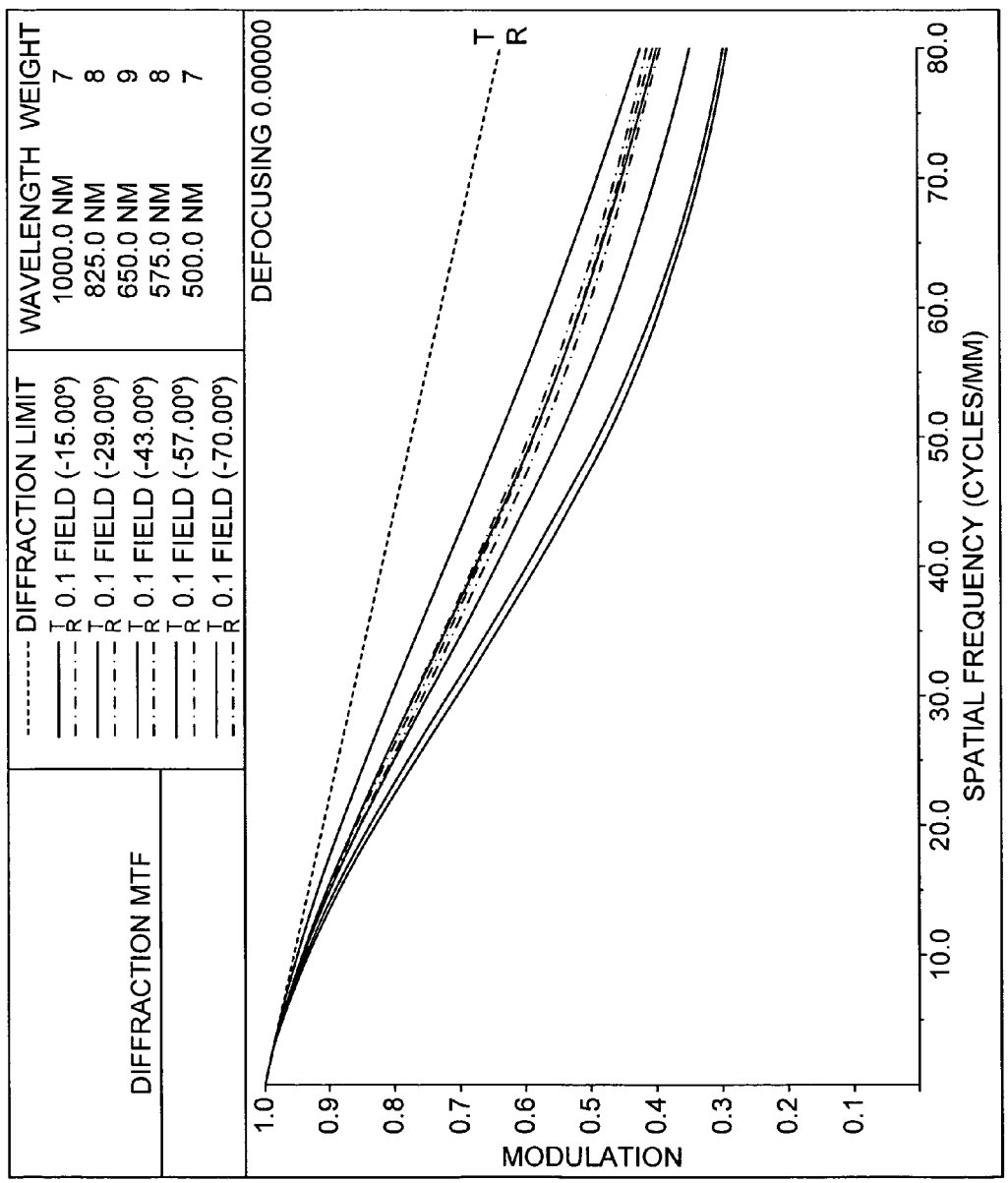
FIG. 4 is a plot characterising the optical performance of the system of FIG. 1 at visible and near infrared wavelengths.
Figure 5:
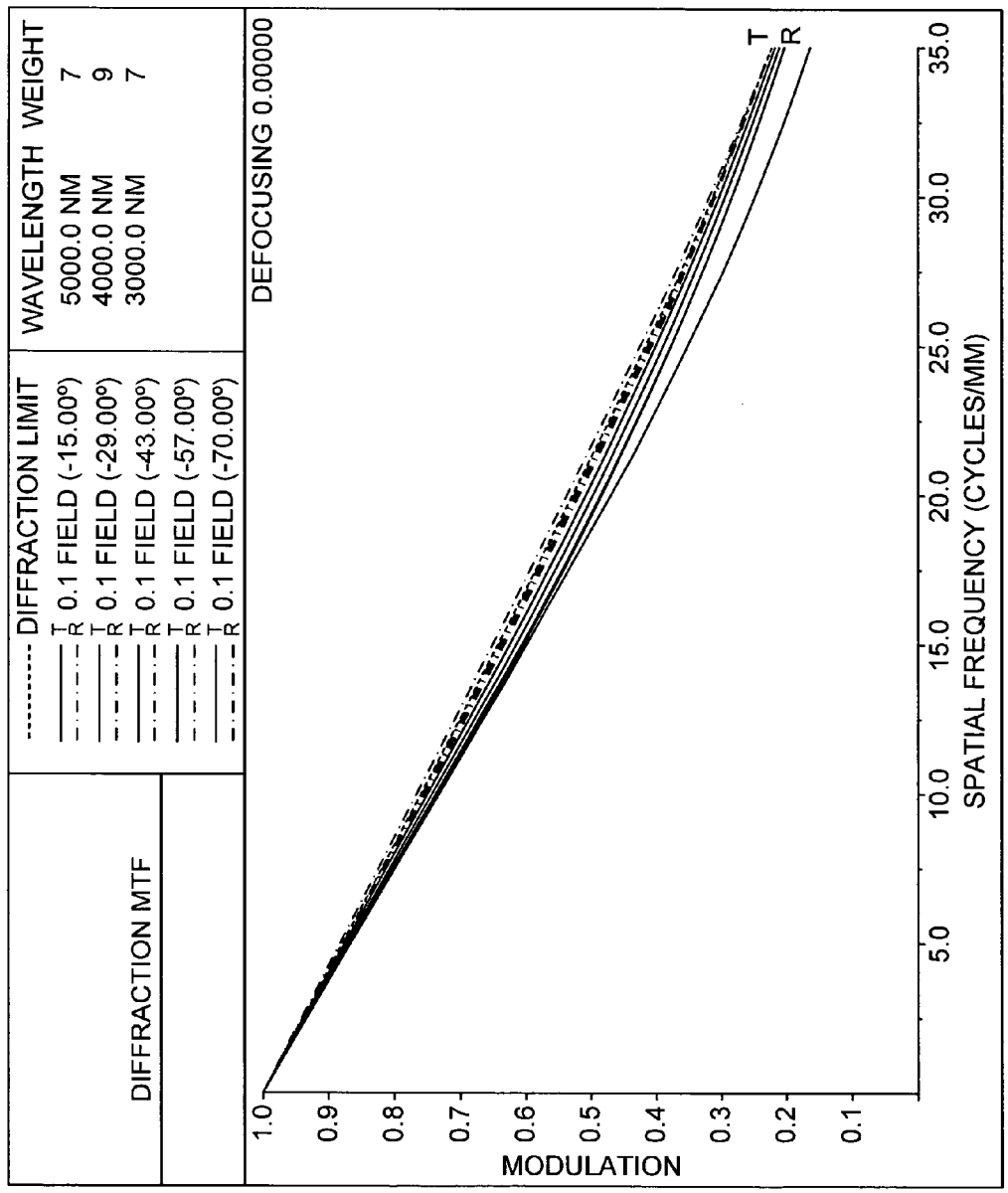
FIG. 5 is a plot characterising the performance of the system of FIG. 1 for intermediate infrared wavelengths.

FIGS. 4 and 5 depict polychromatic diffraction MTF performance plots characterising image modulation as a function of spatial frequency for visible and near infrared and intermediate infrared wavelength bands, respectively. For each wavelength band, several plots across the field of view, as well as the diffraction limit are plotted. Assuming an acceptable level of modulation (contrast) of 30%, a resolution of 80 cycles per millimeter can be achieved for the visible and near infrared band and a resolution of approximately 30 cycles per millimeter can be achieved for the intermediate infrared wavelength band (the latter being substantially diffraction limited for the specific embodiment described above.)

Figure 6:
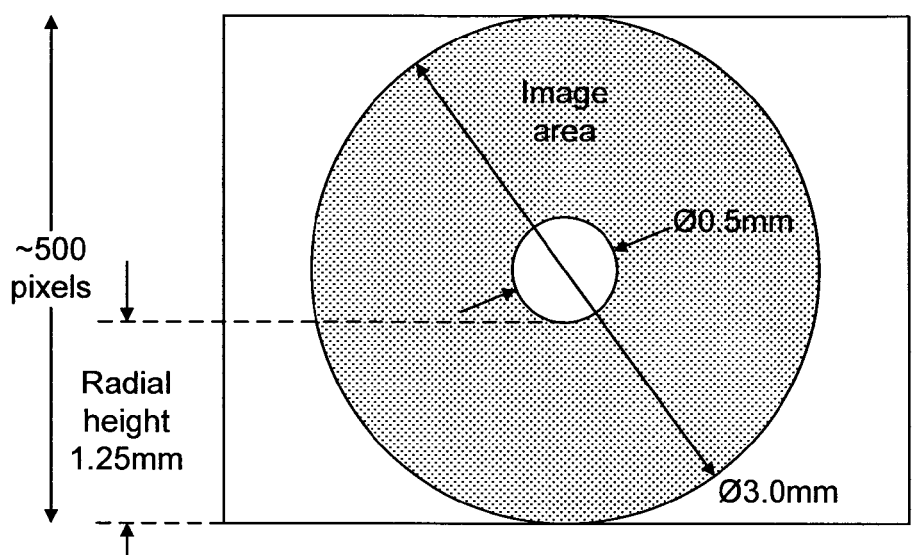
FIG. 6 is a schematic representation of an enlarged area on an image sensor.

The image area in image plane 15 and 19 for a specific optical prescription as set out in Table 1 is illustrated schematically, together with an approximate outline for a one/six inch 4:3 format detector in FIG. 6. The field of view extends for 360 degrees about the optical axis and from 15 to 70 degrees away from the optical axis looking forward (or, in other words, 140 degrees on axis with a 30 degrees central blind spot looking forward along the optical axis). The corresponding image in the image planes is a doughnut shape with an outer diameter of approximately 3.0 millimeter and an inner diameter of approximately 0.5 millimeter, meaning that a ⅕ or a ⅙ inch detector may cover the image areas.

Taking the minimum dimension of any detector (usually the vertical dimension), the maximum number of pixels available for a given detector size and format can be determined. For example, for a ⅙ inch 4:3 format detector which has 500 pixels vertically, about 208 pixels are available for the 15 to 70 degree field of view (about 83% ((3.0-0.5)/3.0) can be used and half that is available for the 15 to 70 degree field of view). This applies to a typical detector used in the visible to near infrared band. In the intermediate and far infrared bands, detector pixel sizes tend to be larger by a factor of 2 to 3 times because of the need for increased sensitivity and, accordingly, for a ⅙ inch detector, 70 to 104 pixels may be available. Based on the resolution derived from the polychromatic diffraction MTF performance plots shown in FIGS. 4 and 5, it can be seen that the optical system is well matched to commercially available ⅙ inch, 4:3 detectors, with each cycle being sampled by approximately two pixels.

The specific embodiment described above gives resolution at 100 meter from the imaging system of about 275 mm or about 6 to 7 pixels for the height (1.8 meter) of an adult human being and a middle infrared channel provides a resolution of about 650 mm which gives about 3 pixels for the same height. These resolutions may not be sufficiently high to allow recognition of objects at a 100 meter distance but may allow the detection of the presence and/or movement of objects about the size of an adult human in the field of view.

If a higher resolution than is available with the specific embodiment using a ⅙ inch detector is required, the entire optical system could be scaled by a factor of 2 and a ⅓ inch detector with a correspondingly increased number of pixels can be used, for example. Evidently, the system can be scaled up or down appropriately depending on the required resolution for a given application and space constraints on the imaging system. Also, the resolution of the system may be improved by re-optimising the system prescription which may include increasing the total number of lens elements in one or both paths.

The general aspherical mirrors used in the specific embodiment described above result in a orthographic projection of the field of view which can be transformed into perspective images of the surrounding field of view, for example as described in "*Catadioptric Omnidirectional Camera*", Shree K. Nayar, 1063/6919/97, IEEE, 1997 or in "*Generation of Perspective and Panoramic Video from Omnidirectional Video*", Venkata N. Peri and Shree K. Nayar, Proc. Of DARPA Image Understanding Workshop, New Orleans, May 1997, herewith incorporated by reference herein.

Where only detection of object position is required, pixel locations can be mapped directly to corresponding azimuth and altitude angles with respect to the imaging system, for example using a look up table. Where detection of movement or changes in the field of view is required, a snapshot may be stored and compared with a further snapshot taken after a predetermined delay in the fashion of a two step tapped delay line. By detecting differences between the two stored images, changes in the scenery can be detected. This can be implemented either in hardware or software. By sampling the field of view relatively infrequently, energy consumption of the imaging system may be minimised, albeit at the cost of a reduced temporal resolution.

It will be understood that it is also envisaged to further split one or both of the beams after the beam splitter using one or more further appropriate beam splitters, for example to split the visible and near infrared band do direct each component to separate respective visible and near infrared imaging planes.

It is further envisaged to adapt the system described above for use with only a single image path and plane, eliminating the beam splitter and split image paths (surfaces 8 to 16) and re-optimising.

As described above, the multi wavelength band imaging system may be housed in any appropriate housing but one particular embodiment of a housing is now described with reference to FIG. 7. This housing can be used with other imaging systems, as well, and, advantageously, provides a self-righting mechanism such that it has an equilibrium position which corresponds to the correct orientation of the imaging system. For example, this allows the system in its housing to be placed on the ground at appropriate locations, for example the ground surrounding a household to be protected. Because of the self-righting functionality, appropriate positioning of the imaging system can be assured even if it is temporarily disturbed by, for example, contact with a passing human or animal. Because it is not necessary to secure the system in place to ensure appropriate positioning, the system can be deployed rapidly, increasing its ease of use.

In particular, the housing may be used with an imaging system having a mirror arrangement as described above but without being adapted for multi-wavelength band imaging. Such a system is to a large extent similar to the one described above but with the beam splitter, and split image paths (surfaces 8 to 16) removed and the remaining components re-optimised.

Figure 7:
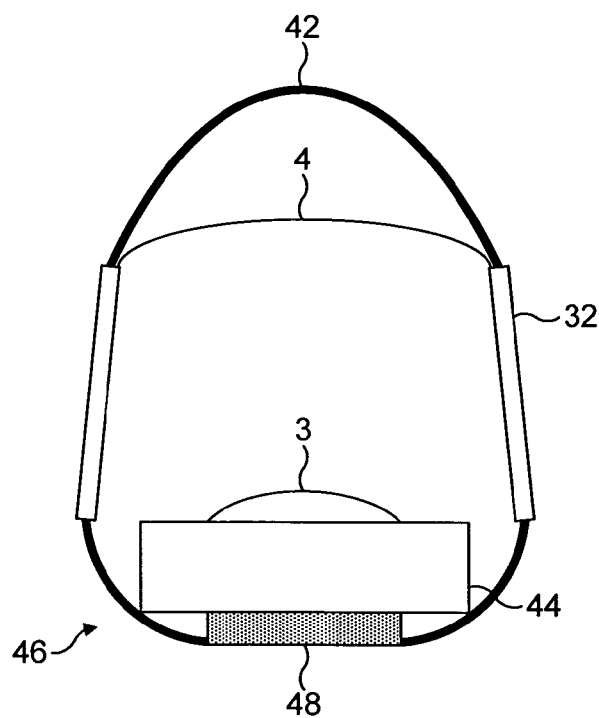
FIG. 7 depicts a self-righting housing for an imaging system.

As depicted in FIG. 7, the housing includes a housing wall 42, which at a lower end 46 has a outer surface which is shaped such that, in conjunction with a weight 48 weighing the lower end 46, the housing has an equilibrium position such that it self-rights to an upright position under the action of gravity. For example, the outer surface of the lower end 46 may have accurate side portions so ensure a smooth rolling action and a flat central portion to ensure a stable equilibrium position. Reflective surfaces 3 and 4 and window 32, as well as the remaining optical components and the image sensors schematically depicted in the figure by box 44 are secured in an appropriate relative configuration, as described above, to the housing wall 42.

The housing may also contain a processor unit for reading and, possibly, processing the output of the image sensors, a wireless transmitter coupled to the processing unit to transmit processed images to a receiving station and a power source device, such as a battery, to provide electrical power to these components. In one embodiment, the power source may at least partially replace the weight 48 to provide the weighting of the lower end 46 of the housing. By providing the imaging system together with means for transmitting the sensed images wirelessly in a single housing which can easily and conveniently be placed in most environments, a surveillance system covering a large area can easily and quickly be set up by distributing an appropriate number of imaging systems in the environment.

It will be understood that other housings for the imaging system are equally envisaged. For example, the system may be looking downwards when mounted on a lamppost or traffic light or may only have a half, 180° field of view such that if can be mounted against a wall, car bumper or other surface.

The embodiments of the optical system described above all have in common a blind spot in the centre of the field of view due to the obscuration caused by the reflective surface 4. An alternative embodiment of an optical system for a multi-wavelength band imaging system (or, equally, an imaging system not specifically adapted for multi-wavelengths band imaging) is now described with reference to FIGS. 8 to 11. In summary, these embodiments eliminate the blind spot in the centre of the field of view by arranging two imaging systems as described above relative to each other such that the blind spot occurs in the periphery of the field of view or within a central linear gap.

Figure 8:
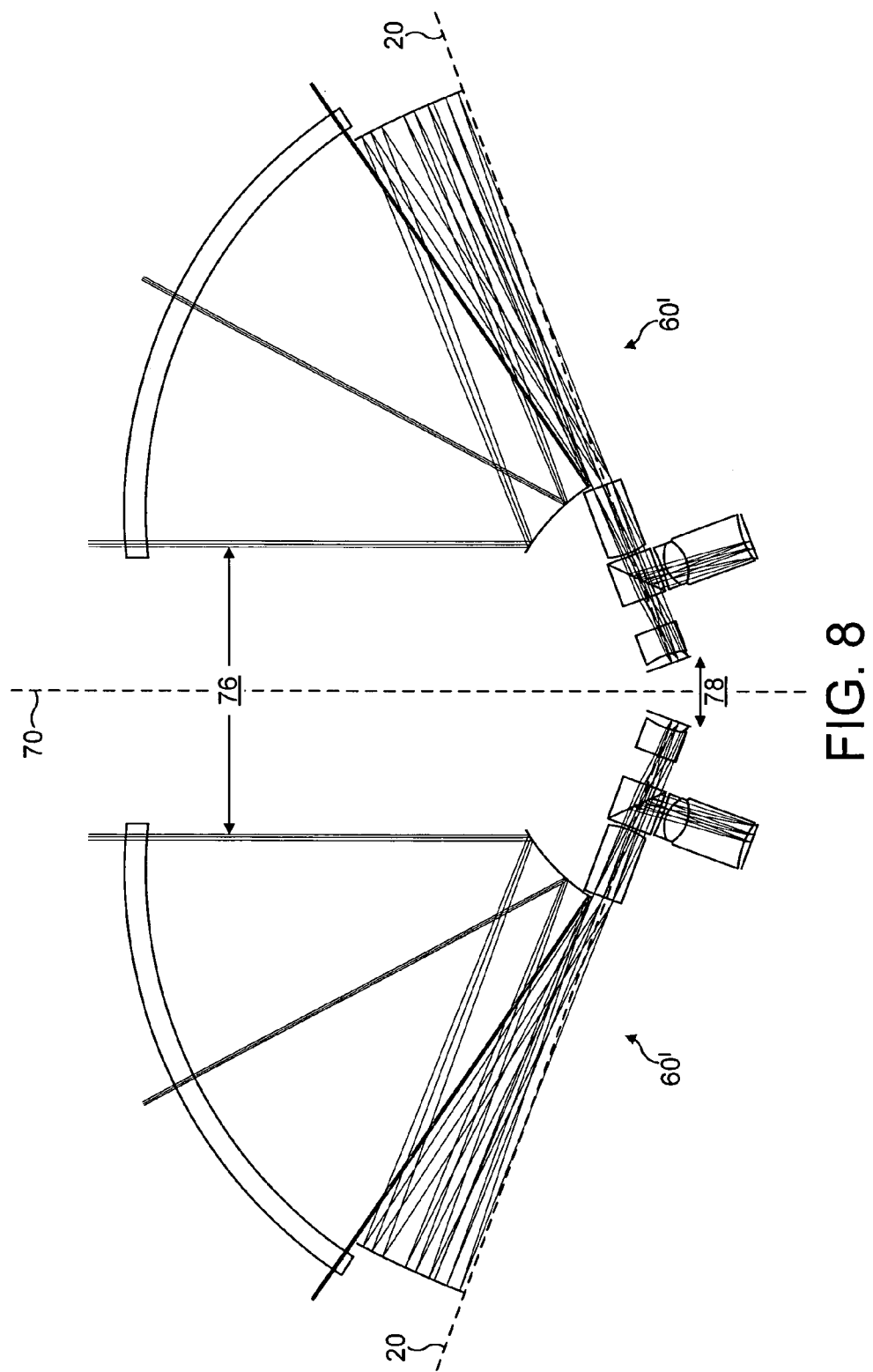
FIG. 8 depicts a schematic representation of a composite objective system comprising two objective systems as represented in FIGS. 1, 2, 3.

With reference to FIG. 8, two objective systems 60' corresponding closely to those described above with reference to FIG. 3 are mounted in a housing (not shown) on either side of a central plane 70. The objective systems 60 and 60' are identical apart from the objective system 60' comprising a window 36 and surfaces 4 and 3 only to one side of the optical axis 20 resulting in a 180° field of view about the optical axis 20 (in effect, this corresponds to the objective system 60 cut in half). The two objective systems 60' are disposed relative to each other such that each field of view extends from directions substantially parallel to the plane 70 away from the plane towards the optical axis 20 and the corresponding blind spot. To this end, the two objective systems 60' are disposed relative to each other with reflective symmetry about the plane 70 and the optical axis rotated 20° away from the normal to the plane 70 (upwards in FIG. 8) to define a contiguous field of view from the blind spot on each side of the arrangement looking upwards in FIG. 8.

It will be understood that the arrangement described with reference to FIG. 8 defines a gap 76 between the fields of view of the two optical systems 60' such that there is a blind spot at small linear resolution (in the near field of view), corresponding to this gap 76. However, since each field of view includes directions substantially parallel to the plane 70, this gap is of substantially fixed linear dimension such that it is significantly below the linear resolution of the arrangement at sufficiently large distances in the field of view, for example ten meters and above. At these resolutions, the field of view is contiguous across the plane 74 for most practical purposes. Away from the plane, the field of view extends 55° away from the plane on each side of it in the region of the blind spot and 70° away from the plane elsewhere where there is no obscuration from the blind spot.

In addition to the gap 76 between the fields of view, the two objective systems 60' further define a gap therebetween which, at its narrowest width 78 between the image planes of the objective systems may be in the region of 1 cm to allow for a preamplifier board supporting the image sensors in the image planes to be placed between the two objective systems 60'. A corresponding gap 76 between the fields of view of the imaging systems 60' would be of the order of 2 to 3 cm.

Figure 9:
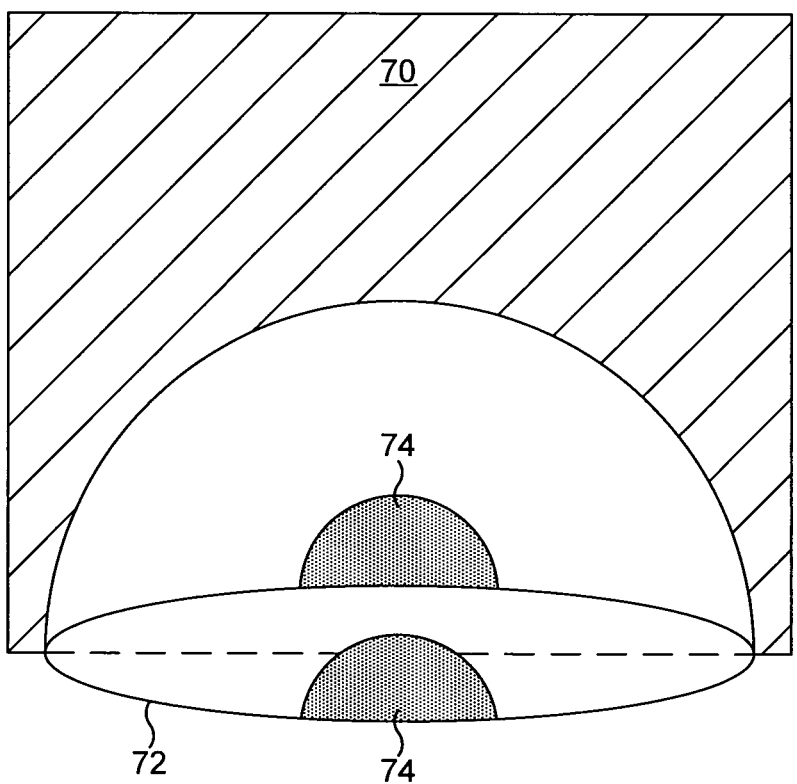
FIG. 9 illustrates a field of view of an objective system similar to the one shown in FIG. 9.

With reference to FIG. 9, the resulting, combined field of view is now described for an arrangement with two modified objective systems similar to the objective system 60' of FIG. 9 in which the optical reflective surfaces have been modified to provide a field of view of 90° outside the blind spot away from the optical axis 20. As illustrated in FIG. 9, the combined field of view 72 of such an arrangement includes 2 quarter spheres extending contiguously on each side of the plane 70 but having a blind spot 74 in a direction perpendicular to the plane 70 corresponding to the reflective surface 4 obscuring the view in that direction.

The corresponding image on the image sensor in each of the image planes 19 and 15 of the optical arrangement 60' consist of half the doughnut shape described above with reference to FIG. 6. The hemispherical field of view illustrated in FIG. 9 can then be recovered by projecting each of the half doughnut shaped images into perspective images as described above and stitching the two resulting images along the edge corresponding to the curved outer edge in the untransformed images. As described above, no such transformation is necessary if only detection of object position is required, in which case pixel detection can be mapped directly to azimuth and altitude angles using a lookup table or if only detection of changes in the environment is required.

Figure 10:
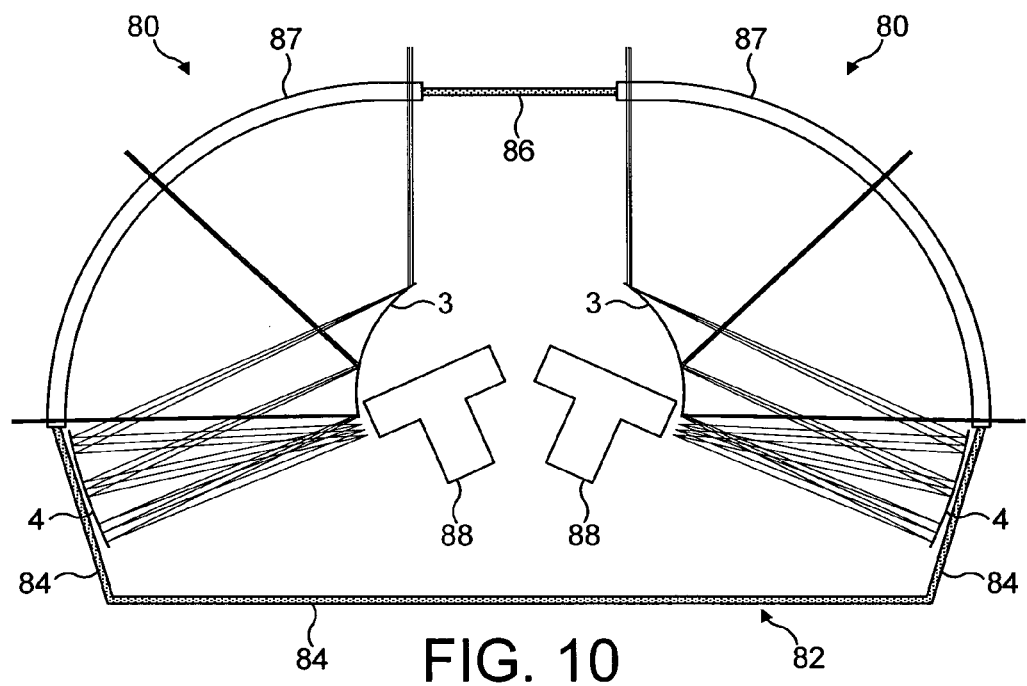
FIGS. 10 and 11 show yet further composite objective systems.

With reference to FIG. 10, the blind spot 74 illustrated in FIG. 9 can further be eliminated by using two objective systems 80 with further modified reflective surfaces 3 and 4 to extend the field of view to 90° from the edge of the obscuration resulting from the reflective surface 4, providing a substantially completely angularly contiguous field of view extending from directions parallel to the plane 70 to directions parallel to a plane perpendicular to the plane 70, as illustrated in FIG. 10. Further illustrated in FIG. 10 is a housing 82 in which the systems 80 are mounted. The housing has a lower wall portion 84 and an upper wall portion 86 between which the windows 87 of the objective systems 80 are mounted. For example, the wall portions 84 and 86 may comprise fixtures for mounting the arrangement to a supporting surface or the wall portion 82 may be weighted as described above for a self righting housing.

As above, the optical components optically after the second reflective surface 4, indicated schematically at 88 in FIG. 10, may be arranged such that the longer radiation pass points downwards to minimise the lateral dimensions of the arrangements.

Figure 11:
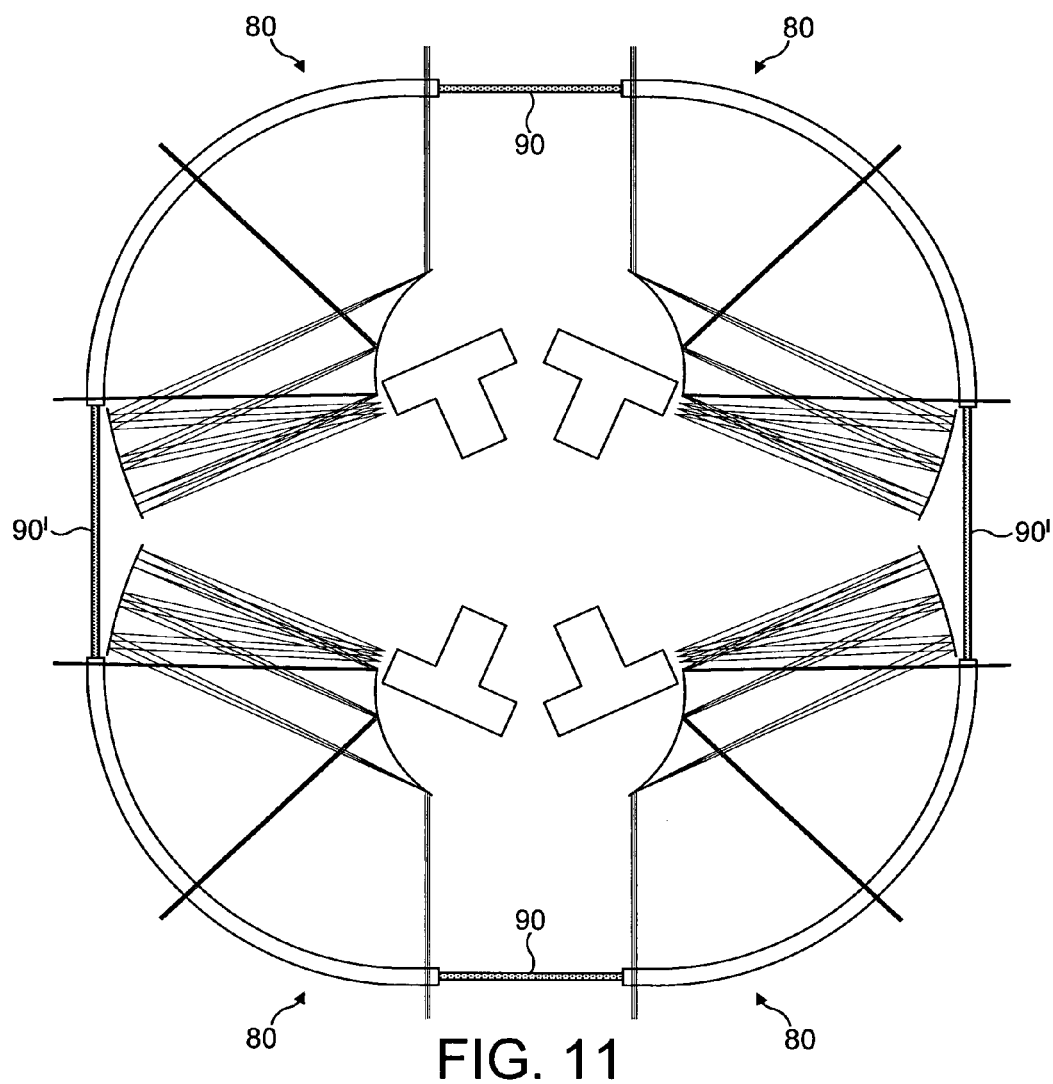

As illustrated in FIG. 11, four imaging systems 80 may be disposed relative to each other in a housing to provide a full 360° field of view in all directions (naturally, at sufficiently low resolutions to account for the linear gaps between the field of views of each objective system). The housing comprises upper and lower wall portions 90 and side wall portions 90' between the respective windows of the imaging systems 80. Of course, it will be appreciated that the arrangement of FIG. 11 may be mounted in any desired sense so that the wall portions 90 may be side wall portions and the wall portions 90' may be upper and lower wall portions. One or more of the wall portions 90, 90' may comprise a fixture for fixing the arrangement to a surface or may be appropriately weighted to define an equilibrium orientation when the arrangement is placed on the ground. Alternatively, the weight distribution of the arrangement may be balanced such that the arrangement can conveniently be rolled into place from a distance.

It will be understood that the arrangements described above with reference to FIGS. 8 to 11 are not limited to use as multi-wavelengths band imaging systems but may be modified by removing one of the two radiation path to obtain a simplified arrangement not necessarily for multi-wavelengths band imaging. However, even with only one radiation path, the sensor may be capable of detecting radiation of multi-wavelength bands. Either straight or folded radiation paths may be eliminated. In the latter case, the need for a beam splitter is obviated, which can result in a significant cost saving. In the former case, the beam splitter can be replaced with a further mirror, also resulting in cost savings and allowing the lateral dimensions of the arrangement part to be reduced due to the folded nature of the radiation part.

Any of the housings described above may further include locating means for detecting the location, orientation or both of the housing. The detected location/orientation can then be transmitted to the receiving station to allow it to locate the scene of the transmitted images. The transmission may be encrypted to prevent unauthorised access to the position of the housing. The locating means may include a GPS receiver.

The above description of specific embodiments is by way of example only and many alterations, modifications or juxtapositions of the features set out above will be apparent to a person skilled in the art and are intended to be covered by the scope of the appendent claims.

The invention claimed is:

1. A multi-wavelength band imaging system comprising:
    an objective system which is arranged to collect radiation emanating from an object space;
    a beam splitter which is arranged to collect radiation from the objective system, split the radiation into radiation in a first wavelength band and radiation in a second wavelength band, and to direct radiation in the first wavelength band to a first image plane and radiation in the second wavelength band to a second image plane;
    first and second image sensors respectively arranged in the first and second image planes; and
    a positively powered refractive optical component having a useful spectral bandpass in the first and second wavelength bands;
    wherein, the objective system includes a convex reflective surface and a concave reflective surface mutually spaced along an optical axis through the beam splitter, the convex reflective surface being disposed to collect radiation from object space and to deliver the collected radiation to the concave reflective surface, and the concave reflective surface being disposed to transfer radiation collected from the convex reflective surface to the beam splitter past the convex reflective surface;
    wherein the positively powered refractive optical component is optically between the concave reflective surface and the beam splitter;
    wherein the first image sensor is adapted for imaging radiation in the first wavelength band, the second image sensor is adapted for imaging radiation in the second wavelength band, the first and second wavelength bands being either side of a wavelength of about 2.7 microns; and
    wherein the first wavelength band is from visible to near infrared and the second wavelength band is intermediate infrared, far infrared or both.

2. The system as claimed in claim 1 which has a field of view measured to one side from an optical axis of about 55 degrees.

3. The system as claimed in claim 1 in which the beam splitter comprises ZnS, ZnSe, MgO, sapphire or diamond.

4. The system as claimed in claim 3 in which the positively powered refractive optical component comprises ZnS, ZnSe, MgO, sapphire or diamond.

5. The system as claimed in claim 1, further including a window optically between the object space and the convex reflective surface in which the window has a useful spectral bandpass in the first and second wavelength bands and in which the window comprises ZnS, ZnSe MgO, sapphire or diamond.

6. The system as claimed in claim 1 in which the concave reflective surface is disposed to transfer radiation collected from the convex reflective surface to the beam splitter through an aperture in the convex reflective surface.

7. The system as claimed in claim 6 which has a field of view of about 140 degrees with a 30 degrees axial blindspot viewed along the optical axis.

8. The system as claimed in claim 6 which has a field of view of substantially 360 degrees about the optical axis.

9. The system as claimed in claim 6 in which the convex and concave reflective surfaces and the aperture are centered on the optical axis.

10. The system as claimed in claim 9 in which the positively powered refractive optical component includes a lens having a first surface adjacent to the aperture and a second opposed surface adjacent to the beam splitter.

11. The system as claimed in claim 10 in which the beam splitter is shaped as a cube having a first surface adjacent to the second surface of the lens and a beam splitting surface configured to reflect the radiation in the first wavelength band at a right angle to the optical axis and transmit the radiation in the second wavelength band along the optical axis through a second surface opposed to the first surface of the cube.

12. The system as claimed in claim 11 in which the first wavelength band is below about 2.7 microns, and the radiation in the first wavelength band is imaged by a lens having four surfaces onto the first image plane.

13. The system as claimed in claim 11 in which the second wavelength band is above about 2.7 microns, and the radiation in the second wavelength band is imaged by a lens having two surfaces onto the second image plane.

14. The system as claimed in claim 1, wherein the system is a first system, and further comprising a second multi wavelength band imaging system placed back to back with the first system in which radiation in a waveband associated with a longer optical path is reflected by beam splitters in both systems and radiation in a waveband associated with a shorter optical path is transmitted by the beam splitters in both systems;
    wherein image sensors in the first and second systems adapted for imaging radiation with the shorter optical path are back to back.

15. The multi-wavelength band imaging system as claimed in claim 1 which is housed in a self-righting housing, which is weighted at a bottom end thereof, which defines an outer surface such that the housing rights itself into an upright orientation under the action of gravity and which includes a window to provide a substantially 360 degree field of view about an axis along the upright orientation, wherein the concave reflective surface is secured adjacent a top end opposite the bottom end and the remaining imaging system is secured adjacent the bottom end.

\* \* \* \* \*